United States Patent
Mujica et al.

(10) Patent No.: US 12,359,557 B2
(45) Date of Patent: **\*Jul. 15, 2025**

(54) SAFETY INTEGRITY LEVEL (SIL) 3 HIGH-INTEGRITY PROTECTION SYSTEM (HIPS) FULLY-FUNCTIONAL TEST CONFIGURATION FOR HYDROCARBON (GAS) PRODUCTION SYSTEMS

(71) Applicant: Saudi Arabian Oil Company, Dhahran (SA)

(72) Inventors: Pedro Alejandro Mujica, Dhahran (SA); Kiran Patel, Al Khobar (SA); Chan Eldon Miller, Dhahran (SA); Herman Roberto Cipriano, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 718 days.

This patent is subject to a terminal disclaimer.

(21) Appl. No.: 17/582,665

(22) Filed: Jan. 24, 2022

(65) Prior Publication Data

US 2022/0145752 A1 May 12, 2022

Related U.S. Application Data

(63) Continuation of application No. 15/441,863, filed on Feb. 24, 2017, now Pat. No. 11,261,726.

(51) Int. Cl.
*E21B 33/03* (2006.01)
*E21B 34/16* (2006.01)
(Continued)

(52) U.S. Cl.
CPC ............. *E21B 47/06* (2013.01); *E21B 34/16* (2013.01); *E21B 41/0021* (2013.01);
(Continued)

(58) Field of Classification Search
CPC ...... E21B 33/03; E21B 34/16; E21B 41/0021; E21B 47/06; G01V 11/002
See application file for complete search history.

(56) References Cited

U.S. PATENT DOCUMENTS

| | | | |
|---|---|---|---|
| 4,215,746 A | 8/1980 | Hallden et al. | |
| 4,798,247 A | 1/1989 | Deaton et al. | |
| | (Continued) | | |

FOREIGN PATENT DOCUMENTS

| | | |
|---|---|---|
| CN | 101369152 | 2/2009 |
| CN | 101369452 | 2/2009 |
| | (Continued) | |

OTHER PUBLICATIONS

SAIP Examination Report in Saudi Arabian Appln. No. 521431062, dated Oct. 6, 2023, 9 pages, with English Translation.
(Continued)

*Primary Examiner* — Matthew R Buck
(74) *Attorney, Agent, or Firm* — Fish & Richardson P.C.

(57) ABSTRACT

A selection of a hydrocarbon well of a hydrocarbon production system is received at a safety logic solver (SLS) for proof testing. Test mode pressure sensors attached to a common header of the hydrocarbon production system are activated to monitor a live process condition status of the common header from all wells of the hydrocarbon production system. A simulated overpressure condition is induced in the operation pressure sensors. An indication of overpressure is received at the SLS from at least two operation pressure sensors. Final elements associated with the hydrocarbon well are signaled to close while leaving other wells in the hydrocarbon production system in operation. The operation pressure sensors are restored to a normal pressure
(Continued)

condition, and the final elements associated with the selected hydrocarbon well are signaled to re-open the hydrocarbon well.

15 Claims, 4 Drawing Sheets

(51) Int. Cl.
*E21B 41/00* (2006.01)
*E21B 47/06* (2012.01)
*E21B 47/117* (2012.01)
*G01V 11/00* (2006.01)

(52) U.S. Cl.
CPC .......... *E21B 47/117* (2020.05); *G01V 11/002* (2013.01); *E21B 33/03* (2013.01)

(56) References Cited

U.S. PATENT DOCUMENTS

| | | | |
|---|---|---|---|
| 5,446,369 A | 8/1995 | Byrne et al. | |
| 5,887,657 A | 3/1999 | Bussear et al. | |
| 6,556,027 B2 | 4/2003 | Banks | |
| 6,880,567 B2 | 4/2005 | Klaver et al. | |
| 7,044,156 B2 | 5/2006 | Vetco | |
| 7,133,727 B2 | 11/2006 | Van Dyk et al. | |
| 7,823,640 B2 | 11/2010 | Flanders | |
| 8,051,875 B2 | 11/2011 | Edwards | |
| 8,161,993 B2 | 4/2012 | Radcliffe | |
| 8,201,624 B2 | 6/2012 | Flanders | |
| 8,327,874 B2 | 12/2012 | Flanders | |
| 8,616,230 B2 | 12/2013 | Studer | |
| 8,725,434 B2 * | 5/2014 | Flanders | F16K 37/0091 702/50 |
| 8,776,609 B2 | 7/2014 | Dria et al. | |
| 10,221,645 B2 | 3/2019 | Elliott | |
| 11,078,755 B2 | 8/2021 | Mujica et al. | |
| 11,261,726 B2 * | 3/2022 | Mujica | G01V 11/002 |
| 2005/0101338 A1 | 5/2005 | Kraft | |
| 2005/0122121 A1 | 6/2005 | Gilboe | |
| 2005/0199286 A1 | 9/2005 | Appleford et al. | |
| 2008/0000529 A1 | 1/2008 | Edwards | |
| 2008/0156077 A1 | 7/2008 | Flanders | |
| 2009/0013807 A1 | 1/2009 | Webster | |
| 2009/0101338 A1 | 4/2009 | Flanders | |
| 2009/0260829 A1 | 10/2009 | Mathis | |
| 2010/0071775 A1 * | 3/2010 | Ratcliffe | E21B 41/0007 137/12 |
| 2011/0061861 A1 | 3/2011 | Flanders | |
| 2011/0133942 A1 | 6/2011 | Flanders | |
| 2011/0144946 A1 | 6/2011 | Flanders | |
| 2014/0039648 A1 | 2/2014 | Boult et al. | |
| 2014/0114577 A1 | 4/2014 | Lopezgarcia et al. | |
| 2014/0212978 A1 | 7/2014 | Sharpe | |
| 2014/0214326 A1 | 7/2014 | Samuel et al. | |
| 2014/0261778 A1 | 9/2014 | Hamilton | |
| 2015/0027730 A1 | 1/2015 | Hall et al. | |
| 2015/0184497 A1 | 7/2015 | Whitby | |
| 2017/0089182 A1 | 3/2017 | Witwer et al. | |
| 2017/0328827 A1 | 11/2017 | Mujica et al. | |
| 2017/0329356 A1 | 11/2017 | Mckeon et al. | |
| 2018/0156004 A1 | 6/2018 | Hussain | |
| 2018/0245452 A1 | 8/2018 | Mujica | |
| 2018/0298738 A1 | 10/2018 | Mujica et al. | |
| 2019/0219230 A1 | 7/2019 | Simon | |
| 2019/0294183 A1 | 9/2019 | Al Khunaizi et al. | |
| 2019/0294184 A1 | 9/2019 | Al Khunaizi et al. | |

FOREIGN PATENT DOCUMENTS

| | | |
|---|---|---|
| CN | 105239993 | 1/2016 |
| CN | 105910088 | 8/2016 |
| EP | 2592318 | 5/2013 |
| EP | 3054203 | 8/2016 |
| JP | 2005308841 | 11/2005 |
| JP | 2005341652 | 12/2005 |
| JP | 2009544008 | 12/2009 |
| JP | 2011053161 | 3/2011 |
| WO | WO 2007132725 | 11/2007 |
| WO | WO 2012054295 | 4/2012 |
| WO | WO 2012100044 | 7/2012 |
| WO | WO 2017196420 | 11/2017 |
| WO | WO 2017218547 | 12/2017 |
| WO | WO 2018037084 | 3/2018 |

OTHER PUBLICATIONS

Dutuit et al., "Probabilistic Assessments in Relationship with Safety Integrity Levels by Using Fault Trees," Reliability Engineering and System Safety, Elsevier Applied Science, Dec. 2008, 93(12):1867-1876.
George, "Subsea Production Equipment Standardisation Initiative," Offshore Technology Conference, OTC-8179-MS, 1996, 2 pages (Abstract only).
Summers, "Wellhead Flowline Pressure Protection using High Integrity Protective Systems (HIPS)," SIS Tech, available on or before 2017, 7 pages.
Woods, "Generating Project Value Through Design for Reliability: On the Development and Implementation of a Potential Value Framework," Thesis submitted for degree of Engineering Doctorate at Cranfield University, Oct. 2007, 274 pages.
CN Office action in Chinese Appln. No. CN 201880026050.3, dated Feb. 19, 2021, 17 pages, with English Translation.
CN Office action in Chinese Appln. No. CN 201880026050.3, dated Oct. 27, 2021, 14 pages, with English Translation.
EPO Communication Pursuant to Rules 161(1) and 162 EPC in European Application No. 17708369.8 on Dec. 18, 2018, 3 pages.
EPO Communication Pursuant to Article 94(3) in European Appln. No. 17708369.8, dated Jun. 7, 2021, 4 pages.
EPO Communication Pursuant to Article 94(3) in European Appln. No. 17708369.8, dated Jun. 30, 2021, 5 pages.
Gulf Cooperation Council Examination Report issued in GCC Application No. GC 2017-33199 on Mar. 19, 2019, 5 pages.
Gulf Cooperation Council Examination Report issued in GCC Application No. GC2018-34815 on Sep. 10, 2019, 4 pages.
Gulf Cooperation Council Examination Report issued in GCC Application No. GC2017-33199 on Sep. 24, 2019, 5 pages.
Gulf Cooperation Council Examination Report issued in GCC Application No. GC2018-35146 on Oct. 7, 2020, 4 pages.
Gulf Cooperation Council Examination Report issued in GCC Application No. GC2018-35146 on Feb. 25, 2021, 5 pages.
JP Office Action in Japanese Appln. No. JP 2018-559703, dated Feb. 10, 2021, 8 pages, with English Translation.
JP Office Action in Japanese Appln. No. 2019-556582, dated Aug. 3, 2021, 4 pages, with English Translation.
PCT International Search Report and Written Opinion in International Application No. PCT/US2018/018976, dated May 4, 2018, 15 pages.
PCT International Search Report and Written Opinion in International Application No. PCT/US2017/018048, dated May 2, 2017, 14 pages.
PCT International Search Report and Written Opinion in International Application No. PCT/US2018/027134, dated Jul. 6, 2018, 16 pages.
PCT International Search Report and Written Opinion in International Application No. PCT/US2020/037166, dated Oct. 2, 2020, 15 pages.
EPO Communication Pursuant to Article 94(3) in European Appln. No. 18723103.0, dated Sep. 15, 2022, 6 pages.

* cited by examiner

SAFETY INTEGRITY LEVEL (SIL) 3 HIGH-INTEGRITY PROTECTION SYSTEM (HIPS) FULLY-FUNCTIONAL TEST CONFIGURATION FOR HYDROCARBON (GAS) PRODUCTION SYSTEMS

CROSS REFERENCE TO RELATED APPLICATION

This application is a continuation of and claims priority to U.S. patent application Ser. No. 15/441,863, filed on Feb. 24, 2017, the entire contents of which is incorporated by reference herein.

BACKGROUND

Safety Integrity Level (SIL) is defined as a relative level of risk-reduction provided by a safety instrumented function (SIF), or to specify a target level of risk reduction. In simple terms, SIL is a measurement of performance required for the SIF. Safety instrumented systems, such as High Integrity Protection Systems (HIPS) with a SIL 3 rating, are typically used for overpressure protection of a downstream piping network system in gas-producing petroleum field (for example, on an offshore gas platform). On an offshore gas platform, there often exists piping system configurations with multiple wells. The HIPS providing overpressure protection to a piping system is required to be tested periodically to meet and maintain a SIL 3 rating. A typical HIPS configuration includes pressure sensors, a safety logic solver, and final elements (for example, valves) that force the final elements (system outputs) to close simultaneously during a functional test. However, downstream processing facilities are adversely affected by reduction of gas flow during the functional test caused by closing of the final elements. Accordingly, mandatory HIPS testing becomes a challenge to continued efficient operation and gas production on the offshore gas platform and downstream installations.

SUMMARY

The present disclosure describes a Safety Integrity Level (SIL) 3 High Integrity Protection System (HIPS) fully-functional test configuration for hydrocarbon (gas) production systems.

In an implementation, a selection of a hydrocarbon well of a hydrocarbon production system is received at a safety logic solver (SLS) for proof testing. Test mode pressure sensors attached to a common header of the hydrocarbon production system are activated to monitor a live process condition status of the common header from all wells of the hydrocarbon production system. A simulated overpressure condition is induced in the operation pressure sensors. An indication of overpressure is received at the SLS from at least two operation pressure sensors. Final elements associated with the hydrocarbon well are signaled to close while leaving other wells in the hydrocarbon production system in operation. The operation pressure sensors are restored to a normal pressure condition, and the final elements associated with the selected hydrocarbon well are signaled to re-open the hydrocarbon well.

The above-previously described implementation is implementable using a computer-implemented method; a non-transitory, computer-readable medium storing computer-readable instructions to perform the computer-implemented method; and a computer-implemented system (including using a solid state logic solver) comprising a computer memory interoperably coupled with a hardware processor configured to perform the computer-implemented method/ the instructions stored on the non-transitory, computer-readable medium.

The subject matter described in this specification can be implemented in particular implementations so as to realize one or more of the following advantages. First, the described configuration of sensors, Safety Logic Solver (SLS), algorithm, and final elements allow fully-functional proof testing of individual wells that are protected by a common HIPS. Second, the described system and methodology is a cost effective solution avoiding total gas platform shutdown to minimize gas flow disruption to downstream clients during mandatory fully-functional proof testing. Third, the described system and methodology requires minimal architectural changes to the design of HIPS configurations for offshore gas platforms with multiple wells. Existing pressure sensors and wiring already included in the design of HIPS for offshore gas applications can be leveraged. Fourth, additional capabilities are made available for reporting and diagnostics features of the HIPS during normal operation and fully-functional proof testing. The additional capabilities can communicate to external control systems for trouble shooting of the HIPS and for analysis of test results. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
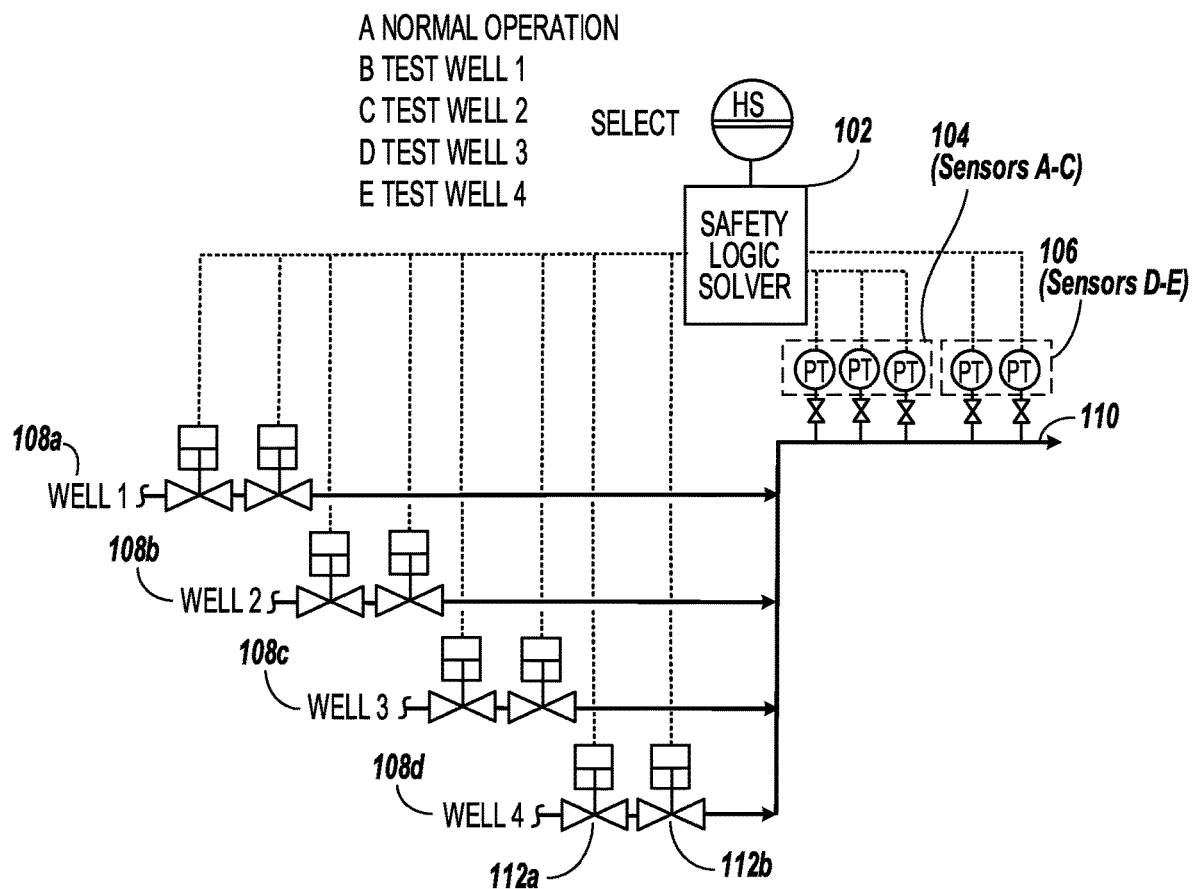
FIG. 1 is a block diagram illustrating an example system providing a Safety Integrity Level (SIL) 3 High Integrity Protection System (HIPS) fully-functional proof test configuration for hydrocarbon (gas) production systems, according to an implementation.

The following detailed description describes a Safety Integrity Level (SIL) 3 High Integrity Protection System (HIPS) fully-functional proof test configuration for hydrocarbon (gas) production systems and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

Safety Integrity Level (SIL) is defined as a relative level of risk-reduction provided by a safety instrumented function (SIF), or to specify a target level of risk reduction. In simple terms, SIL is a measurement of performance required for the SIF. Safety instrumented systems, such as High Integrity Protection Systems (HIPS) with a SIL 3 rating, are typically used for overpressure protection of a downstream piping network system in gas-producing petroleum field (for example, on an offshore gas platform). On an offshore gas platform, there often exists piping system configurations with multiple wells. The HIPS providing overpressure protection to a piping system is required to be tested periodically to meet and maintain a SIL 3 rating. A typical HIPS configuration includes pressure sensors, a safety logic solver, and final elements (for example, valves) that force the final elements (system outputs) to close simultaneously during a functional test. However, downstream processing facilities are adversely affected by reduction of gas flow during the functional test caused by closing of the final elements. Accordingly, mandatory HIPS testing becomes a challenge to continued efficient operation and gas production on the offshore gas platform and downstream installations.

The described configuration allows fully-functional proof testing using a SIF of individual hydrocarbon producing wells in an offshore gas platform that are protected by measuring pressure on a common header HIPS while gas is flowing and without losing/closing all of the wells. An individual well can be shut down while the test is being performed while remaining wells remain in production. The proposed HIPS configuration maintains SIL 3 throughout performed tests. The described system and methodology is a cost effective solution avoiding total gas platform shutdown to minimize gas flow disruption to downstream clients during mandatory fully-functional proof testing. The described system and methodology also requires minimal architectural changes to the design of existing HIPS configurations for offshore gas platforms with multiple wells because existing HIPS pressure sensors and wiring can be leveraged. Additional capabilities are made available for reporting and diagnostics features of the HIPS during normal operation and fully-functional proof testing. The additional capabilities can communicate to external control systems for trouble shooting of the HIPS and for analysis of test results.

Although the following description is directed to offshore gas platforms and gas pipelines, as will be understood by those of ordinary skill in the art, in other implementations, the described methodology and system can be adapted to work with onshore and offshore liquid petroleum or other liquids. These other implementations, as far as they are consistent with this disclosure, are considered to be within the scope of the disclosure.

FIG. 1 is a block diagram illustrating an example system 100 providing a SIL 3 HIPS fully-functional proof test configuration for hydrocarbon (gas) production systems, according to an implementation. Example system 100 permits testing of a petroleum production system with minimal production impact and maintaining the required safety availability for the petroleum production system during the test. System 100 includes a Safety Logic Solver (SLS) 102, operation pressure sensors 104 (here three sensors A-C), test mode pressure sensors 106 (here two sensors D-E), multiple wells (here wells 1-4 (108a-108d, respectively)), and header/downstream pipeline network system 110. Each well 108a-108d also includes at least two final elements 112a & 112b (for example, valves, circuit breakers in Electrical Submersible Pump (ESP) application, or other final elements in a configuration per well) configured to stop a flow of gas through the downstream pipeline network system 110 (common header) when an overpressure trip set point is reached and SLS 102 sends a signal to close the final elements. The combination of wellhead, well-piping, and final elements can be referred to as a flow arm.

The SLS 102 is interoperably connected with each of the final elements for each well 108a-108d and each of the operation pressure sensors 104 and test mode pressure sensors 106. The SLS 102 can be configured to permit both normal operation and to test a single well in system 100 according to SIL 3 requirements for response to an overpressure scenario. Note, that all pressure sensors are located on the common header 110 used for process monitoring and trip.

In typical implementations, operation pressure sensors 104 are typically of a 2oo3 voting configuration for SIL 3 compliance. In a 2oo3 configuration, there are three voting "channels" (each occupied in the illustrated system 100 by an operation pressure sensor 104), two channels requiring being healthy in order to perform with a SIF. The test mode pressure sensors 106 are typically of a 1oo2 configuration to meet SIL 3 compliance (compliance to meet the minimum Hardware Fault Tolerance (HFT) required to maintain a SIL 3 rated system during testing). In a 1oo2 configuration there are two voting "channels" (each occupied in the illustrated system 100 by a test mode operation pressure sensor 106), if a fault occurs in a particular channel, the SIF will go to a safe state.

The SLS 102 is configured to permit fully-functional proof testing of system 100 maintaining SIL 3 requirements using captured pressure readings and operation of one or more final elements (for example, final elements 112a/112b) for all wells 108a-108d. The SLS 102 can be solid state or electronic (for example, a safety electronic programmable logic controller (Safety e-PLC)) and includes a proprietary built-in algorithm to process input from the operation pressure sensors 104, test mode pressure sensors 106, and execute an action on the final elements (for example, 112a/112b). The SLS 102 can also send signals to the final elements to cause them to operate (for example, open or close). During test mode, manual hydraulic pumps (not illustrated) are used to simulate a process upset by increasing the pressure associated with the operation pressure sensors 104 to cause a simulated overpressure situation for testing purposes.

For testing purposes of operation pressure sensors 104, a manual hydraulic pump can be connected to valve arrangements at an inlet manifold of the pressure sensors (not illustrated). The valve arrangements, allow a technician to block/isolate tested sensors 104 from the live process, in a way that the operation pressure sensors 104 read the pressure simulated from the manual hydraulic pump operated by the technician. Then, through a test port-in the valve arrangement, the manually operated hydraulic pump is exercised to increase pressure readings returned by the sensors 104 in test mode, which in turn simulates an increase in pressure. While simulating increased pressure readings, the SLS 102 is set to test mode and a real process condition is being read by the test mode sensors 106. Readings coming from sensors 104 are influenced by the hydraulic pump as part of the test and SLS 102 is programmed to only close the well selected in test mode when the pressure in operation pressure sensors 104 (artificially increased) reach a pressure trip set point. The signals sent from the SLS 102 to the final elements (or other final elements) can include various commands. In some implementations, there can be limit switches, for example, that provide feedback from valve actuators to the SLS 102 to indicate full closure of valves. SLS 102 provides functionality for testing one well at a time as well as diagnosis of the entire system 100 prior to entering in test mode (that is, confirming that all pressure sensors are functional/healthy).

In typical implementations, the SLS 102 can also provide output data. The provided output data can be used to indicate (for example, on a computer display or with some other type of indication—such as visual or auditory) of a particular well being tested, status of pressure sensors (for example, healthy or failed), final element status (for example, valve positions), testing-in-progress, normal operation, and the like.

In typical implementations, SLS 102 can return the system to normal operation after a predefined proof test duration time has elapsed. Here, normal operation is defined as all wells/flow-arms responding to the 2oo3 voting logic from the operation pressure sensors 104 for system 100.

In a typical HIPS configuration, when an abnormally high-pressure condition is measured by the operation pressure sensors 104, the SLS 102 processes the signals as a trip using 2oo3 voting logic, de-energizes the outputs to final elements for each well (for example final elements 112a and 112b associated with each well 108a-108d), and consequently the final elements will simultaneously close. While, this particular functionality requires periodic, mandatory proof testing to maintain the SIL 3 required by the process, the simultaneous closing of all final elements during the functional test has an adverse effect on downstream processing facilities caused by sudden reduction/stoppage of gas flow during the proof test.

System 100 permits fully-functional proof testing of a SIF without simultaneously shutting all the final elements and while maintaining flow/production from the well(s) that are protected by the HIPS but is/are not being tested. For example, in FIG. 1, a single flow arm (well) being tested (for example, well 4, 108d) can be shut by closing one or both of final elements 112a and 112b when a 2oo3 voting of SIF sensors 104 is artificially forced to reach abnormally high pressures (for example, forcing a pressure trip set point using manual test pumps attached during the test to the operation pressure sensors 104 through test port arrangements at the inlet of the pressure sensors) as part of a proof test. As a result, the disruption of gas flow from the hydrocarbon production system (for example, an offshore gas platform) is minimal to downstream systems. Additionally, during testing, all wells (that is a well(s) in test mode and other wells which are flowing) will be protected at all times with a SIL 3 SIF in case of a real overpressure demand occurring. The real/live pressure conditions of the offshore gas platform during the test will also be monitored, and the offshore gas platform will remain safely protected by an alternate set of pressure sensors (for example, test mode pressure sensors 106) in a 1oo2 voting arrangement. In other words, when a particular well is selected for testing, the SLS 102 will automatically select operation pressure sensors 104 in a 2oo3 voting mode for the test, and 1oo2 test mode pressure sensors 106 will take over the monitoring of real/live well conditions during testing (SLS 102 logic automatically selects appropriate pressure sensors depending on the selected operation/test mode). This configuration offers overpressure protection for all the wells to maintain a required SIL 3 rating as the test mode pressure sensors 106 and SLS 102 logic will trigger all flow arms to close (including the well in test mode) if an actual demand exceeding a defined (for example, a real overpressure case occurring during testing due to a downstream blockage) pressure trip set point is placed on the system during testing.

Remote reporting functionality is also provided by system 100 (for example, hard wired or wireless/wired/fiber-optic/radio communication, etc. between the SLS 102 configured to report the health/condition of the operation pressure sensors 104 and test mode pressure sensors 106, final elements, or other elements of system 100 (whether or not illustrated)) to a remote monitoring system (not illustrated) by applicable industrial protocols consistent with this disclosure. In typical implementations, the operation pressure sensors 104 and test mode pressure sensors 106 and final elements are connected to the SLS 102, which centralizes information for reporting.

Figure 2A:
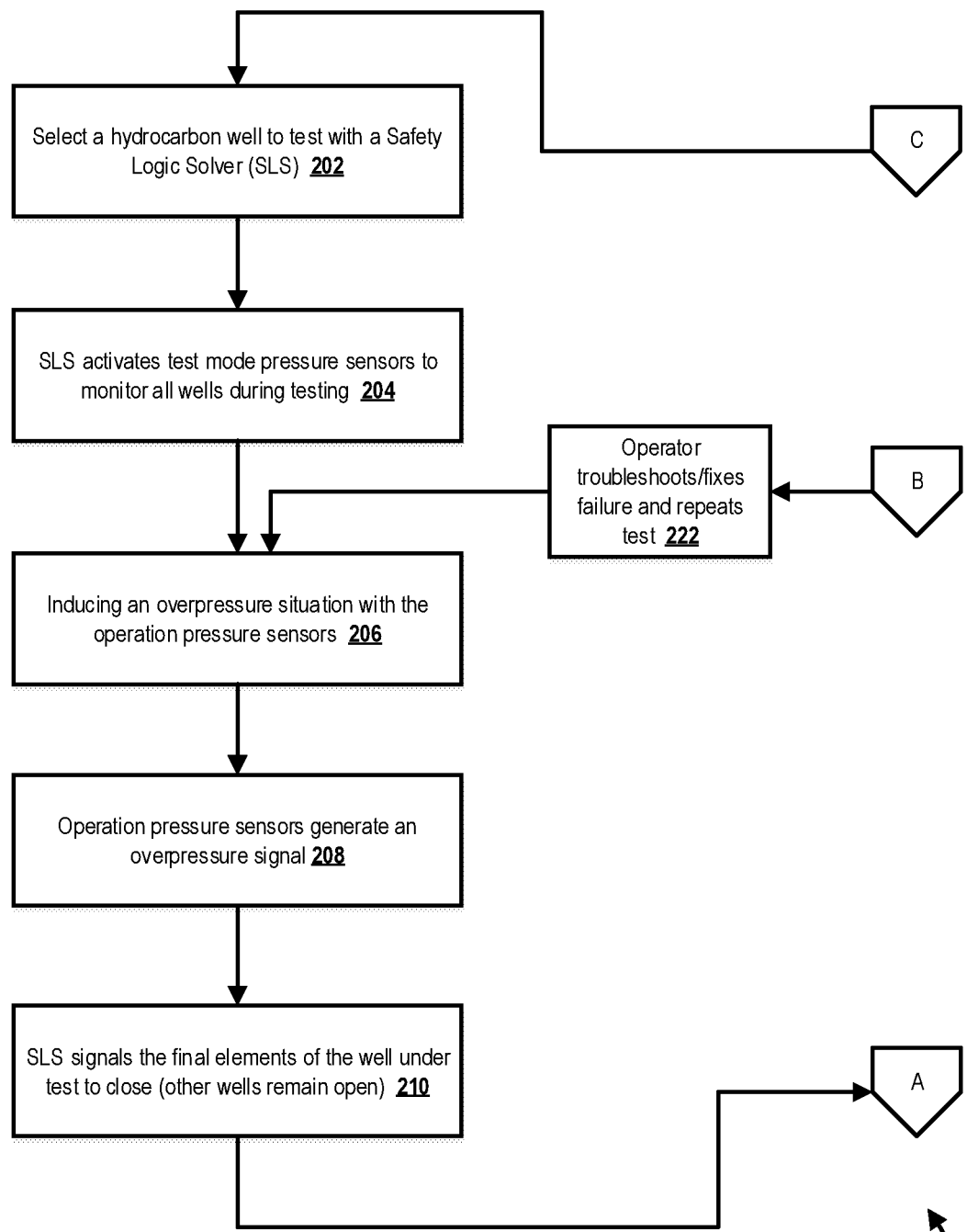
FIGS. 2A-2B illustrate a flowchart of an example method for a SIL 3 HIPS fully-functional test configuration for hydrocarbon (gas) production systems, according to an implementation.
Figure 2B:
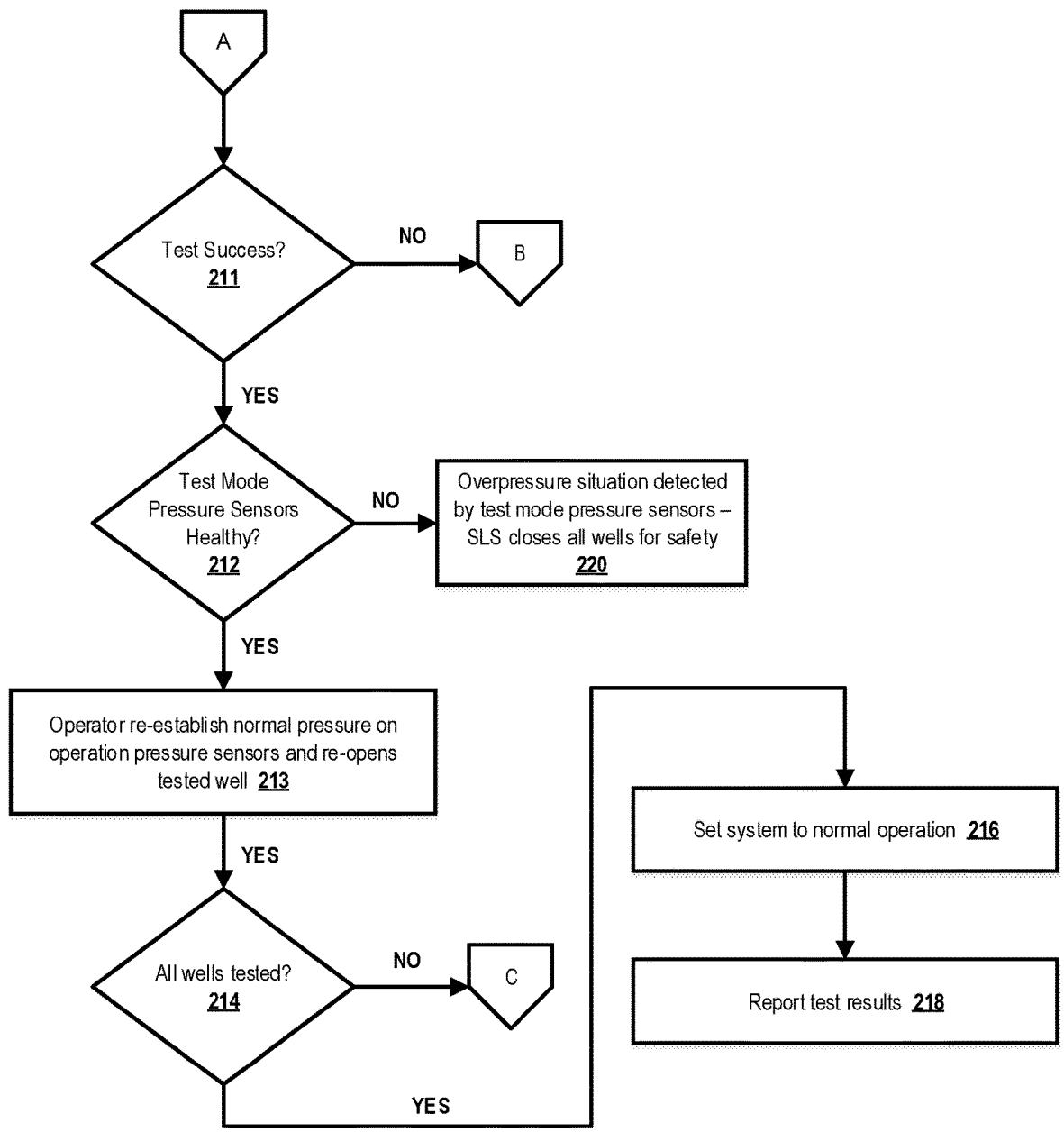

FIGS. 2A-2B illustrate a flowchart of an example method 200 (divided into methods 200a and 200b) for a SIL 3 HIPS fully-functional test configuration for hydrocarbon production systems, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, a particular hydrocarbon well ("well") of a group of wells is selected and indicated to an SLS for proof testing (achieving full SIF proof testing of pressure sensors, SLS, and final elements). For example, in FIG. 1, a user can select "Test W4" (that is, test well 4). From 202, method 200a proceeds to 204.

At 204, SLS logic activates test mode pressure sensors (for example, test mode pressure sensors 106 (D-E)) attached to a common header (for example, common header 110) with the operation pressure sensors (for example, operation sensors 104 (sensors A-C)) of the hydrocarbon production system. The test mode pressure sensors (for example, test mode pressure sensors 106) are used to monitor a live process condition status of the common header from all wells (including the well undergoing testing) to determine whether the overall system (for example, system 100) is below a high-pressure set point value (for example, 1000 psi). Note that while a check of the test mode pressure sensors is illustrated as performed at 212, in typical configurations, the test mode pressure sensors can be monitoring and reporting abnormal values and the SLS responding to any reported abnormal value at any step of method 200 to mitigate any damage to the overall system. From 204, method 200a proceeds to 206.

At 206, an overpressure situation is induced with the operation pressure sensors. For example, the operation pressure sensors can receive a simulated overpressure condition induced by an operator manually pumping up the pressure (for example, driving test pumps attached to the operation pressure sensors to artificially generate a higher than normal pressure situation). The induced pressure affects pressure reading but not process conditions. Note that pressure sensors can be considered "intelligent" devices. By interfacing an electronic device (such as a Highway Addressable Remote Transducer (HART) communicator) to a pressure sensor, the operator could simulate the pressure electronically, but this activity would not test pressure sensor functionality and would not be considered a whole-loop proof test. From 206, method 200a proceeds to 208.

At 208, operation pressure sensors generate an overpressure signal to the SLS. For example, two or more of the 2oo3 operation pressure sensors generate a signal of an overpressure situation to the SLS. If only one pressure sensor senses high pressure, it can indicate an alarm on the SLS panel (indicating an abnormal condition—a deviation alarm). However, a single sensor is typically not enough to initiate a trip for testing purposes. To initiate a trip, at least two out of three (2oo3) operation pressure sensors need to be at a pressure trip set point or higher. During the functional test, multiple combinations of the 2oo3 operation pressure sensors are tested, meaning at least three combinations of the operation pressure sensors are induced to abnormally high pressure (for example, A/B, B/C, and A/C). From 208, method 200a proceeds to 210.

At 210, responsive to receiving the generated indication of overpressure from the operation pressure sensors, the SLS signals the final elements of the well under test (for example, final elements 112a/112b of well 4) to close while leaving the remaining wells in live operation (that is, left open as-is). Note, to achieve a SIL 3 rating, it is necessary to have two final elements per flow arm. Note that the described methodology could also be deployed for systems requiring less integrity (for example, SIL 2). From 210, method 200a proceeds to 211 in FIG. 2B.

At 211, a determination is made of the success of the proof test of the selected well (for example, based on a time duration or other factor) by verifying responsiveness of the operating pressure sensors being tested, the health of the logic, and response of the individual well final elements (the success of the proof test could be done manually by the technician or in-built logic in the SLS could report a successful test). If it is determined that the test was successful, method 200b proceeds to 212. If it is determined that the test found a failure of any of the loop components, method 200b proceeds to 222 in FIG. 2A where the operator can troubleshoot/fix the cause of the failure and initiate a repeat of the proof test of the selected well. From 222, method 200a proceeds back to 206.

At 212, a determination is made as to whether the test mode pressure sensors are healthy (indicating the actual process pressure has not exceeded a determined pressure trip set point—that is, not in an overpressure state). If it is determined that the test mode pressure sensors are healthy, method 200b proceeds to 213. If it is determined that the test mode pressure sensors are not healthy, method 200b proceeds to 220. At 220, an overpressure situation has been detected by the test mode pressure sensors. The SLS signals final elements associated with each well (including the well under test) to shut off production flow from all wells (note that, in this example, the well under test has already been closed due to testing activities) for safety reasons.

At 213, the operator re-establishes the well being tested to normal operation. For example, the simulated overpressure is bled from the operation pressure sensors, and the well under test is reopened for normal flow/operation. From 213, method 200b proceeds to 214.

At 214, a determination is made as to whether all wells have been tested. If it is determined that all wells have not been tested, method 200b proceeds back to 202 in FIG. 2A and testing continues (for example, by selecting an untested well on the platform to be tested until all wells are tested). If it is determined that all wells have been tested, method 200b proceeds to 216.

At 216, the system is set to normal operation. For example, the operator can remove test pumps for simulating overpressure from the operation pressure sensors to restore the operation sensors to a normal pressure condition. Then the SLS mode configuration can be set to "Normal Operation," the proprietary logic in the SLS associated with the operation pressure sensors is returned to sense actual process conditions and the test mode logic in the SLS associated with the test pressure sensors is deactivated. From 216, method 200b proceeds to 218.

At 218, results of the executed test are reported (for example, using the previously-described remote reporting or other functionality consistent with this disclosure). After 218, method 200b stops.

Figure 3:
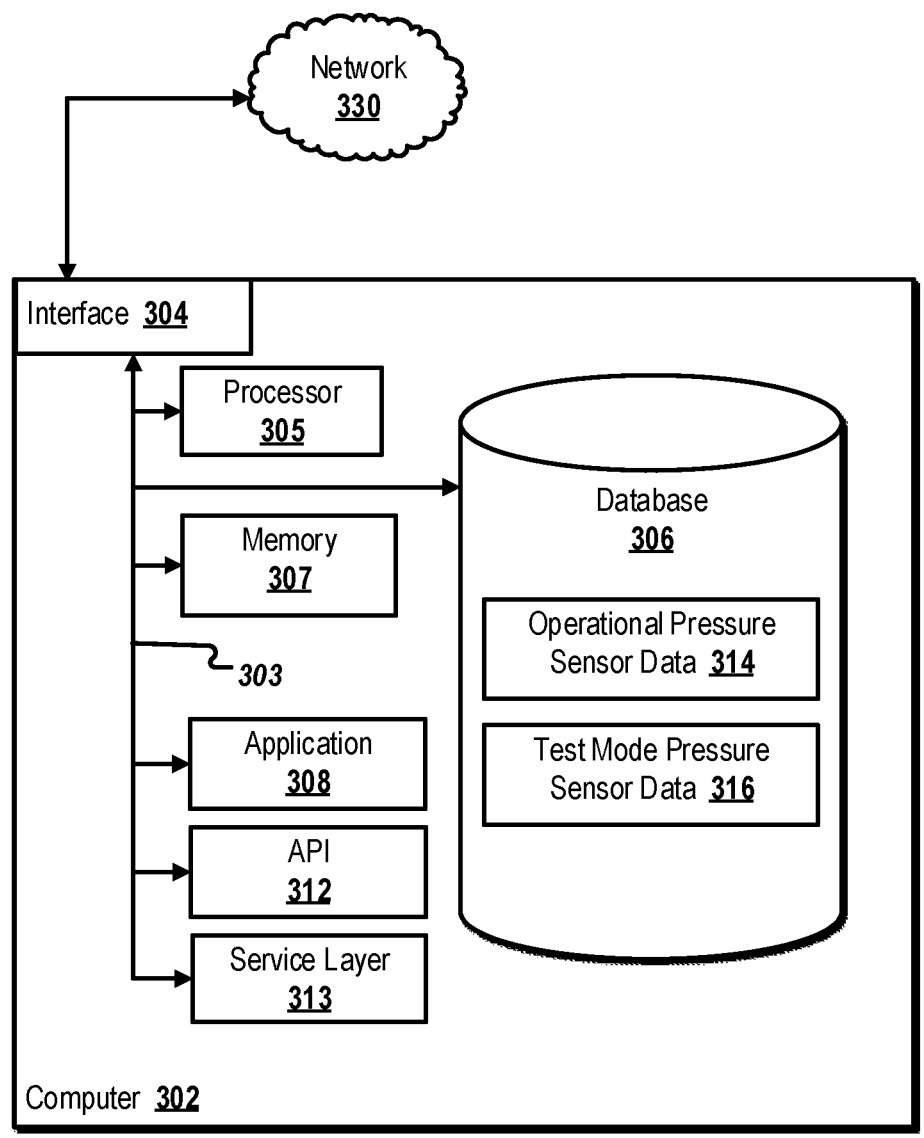
FIG. 3 is a block diagram illustrating an exemplary computer system used to provide computational functionalities associated with described algorithms, methods, functions, processes, flows, and procedures as described in the instant disclosure, according to an implementation.

FIG. 3 is a block diagram of an exemplary computer system 300 used to provide computational functionalities associated with described algorithms, methods, functions, processes, flows, and procedures as described in the instant disclosure, according to an implementation. The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a graphical user interface (GUI).

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 or other components (or a combination of both) that can be connected to the network 330 (whether illustrated or not). For example, database 306 can be an in-memory, conventional, or other type of database storing data consistent with this disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302. As illustrated, the database 306 holds operation pressure sensor data 314 and test mode pressure sensor data 316 as previously described. In other implementations, the operation pressure sensor data 314 or test mode pressure sensor data 316 can be held in the memory 307 or other components (whether or not illustrated) of system 100.

The computer 302 also includes a memory 307 that can hold data for the computer 302 or other components (or a combination of both) that can be connected to the network 330 (whether illustrated or not). For example, memory 307 can be random access memory (RAM), read-only memory (ROM), optical, magnetic, and the like storing data consistent with this disclosure. In some implementations, memory 307 can be a combination of two or more different types of memory (for example, a combination of RAM and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in this disclosure. For example, application 308 can serve as one or more components, modules, applications, etc. Further, although illustrated as a single application 308, the application 308 may be implemented as multiple applications 307 on the computer 302. In addition, although illustrated as integral to the computer 302, in alternative implementations, the application 308 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a computer-implemented method, comprising: receiving a selection of a hydrocarbon well of a hydrocarbon production system at a safety logic solver (SLS) for proof testing; activating test mode pressure sensors attached to a common header of the hydrocarbon production system to monitor a live process condition status of the common header from all wells of the hydrocarbon production system; inducing a simulated overpressure condition in the operation pressure sensors; receiving an indication of overpressure at the SLS from at least two operation pressure sensors; signaling final elements associated with the hydrocarbon well to close while leaving other wells in the hydrocarbon production system in operation; restoring the operation pressure sensors to a normal pressure condition; and signaling the final elements associated with the selected hydrocarbon well to re-open the hydrocarbon well.

The foregoing and other described implementations can each optionally include one or more of the following features:

A first feature, combinable with any of the following features, wherein the proof testing is a fully-functional test of a safety instrumented function, pressure sensors, the SLS, and final elements associated with the hydrocarbon production system.

A second feature, combinable with any of the previous or following features, wherein the monitored live process condition is whether the overall hydrocarbon production system is below a high-pressure set point value.

A third feature, combinable with any of the previous or following features, wherein the simulated overpressure condition is induced using a pump attached to valve arrangements at the inlets of operation pressure sensors.

A fourth feature, combinable with any of the previous or following features, wherein the at least two operation pressure sensors read pressure values at or above a pressure trip set point.

A fifth feature, combinable with any of the previous or following features, further comprising: determining that proof testing of the hydrocarbon well has failed; troubleshooting and fixing a cause of the failure; and initiating a repeat of the proof testing of the hydrocarbon well.

A sixth feature, combinable with any of the previous or following features, further comprising: determining that the test mode pressure sensors are not healthy; and signaling final elements associated with all wells in the hydrocarbon production system to close for safety reasons.

In a second implementation, a non-transitory, computer-readable medium storing one or more instructions executable by a computer system to perform operations comprising: receiving a selection of a hydrocarbon well of a hydrocarbon production system at a safety logic solver (SLS) for proof testing; activating test mode pressure sensors attached to a common header of the hydrocarbon production system to monitor a live process condition status of the common header from all wells of the hydrocarbon production system; inducing a simulated overpressure condition in the operation pressure sensors; receiving an indication of overpressure at the SLS from at least two operation pressure sensors; signaling final elements associated with the hydrocarbon well to close while leaving other wells in the hydrocarbon production system in operation; restoring the operation pressure sensors to a normal pressure condition; and signaling the final elements associated with the selected hydrocarbon well to re-open the hydrocarbon well.

The foregoing and other described implementations can each optionally include one or more of the following features:

A first feature, combinable with any of the following features, wherein the proof testing is a fully-functional test of a safety instrumented function, pressure sensors, the SLS, and final elements associated with the hydrocarbon production system.

A second feature, combinable with any of the previous or following features, wherein the monitored live process condition is whether the overall hydrocarbon production system is below a high-pressure set point value.

A third feature, combinable with any of the previous or following features, wherein the simulated overpressure condition is induced using a pump attached to valve arrangements at the inlets of operation pressure sensors.

A fourth feature, combinable with any of the previous or following features, wherein the at least two operation pressure sensors read pressure values at or above a pressure trip set point.

A fifth feature, combinable with any of the previous or following features, further comprising: determining that proof testing of the hydrocarbon well has failed; troubleshooting and fixing a cause of the failure; and initiating a repeat of the proof testing of the hydrocarbon well.

A sixth feature, combinable with any of the previous or following features, further comprising one or more instructions for: determining that the test mode pressure sensors are not healthy; and signaling final elements associated with all wells in the hydrocarbon production system to close for safety reasons.

In a third implementation, a computer-implemented system, a computer-implemented system, comprising: a computer memory; and a hardware processor interoperably coupled with the computer memory and configured to perform operations comprising: receiving a selection of a hydrocarbon well of a hydrocarbon production system at a safety logic solver (SLS) for proof testing; activating test mode pressure sensors attached to a common header of the hydrocarbon production system to monitor a live process condition status of the common header from all wells of the hydrocarbon production system; inducing a simulated overpressure condition in the operation pressure sensors; receiving an indication of overpressure at the SLS from at least two operation pressure sensors; signaling final elements associated with the hydrocarbon well to close while leaving other wells in the hydrocarbon production system in operation; restoring the operation pressure sensors to a normal pressure condition; and signaling the final elements associated with the selected hydrocarbon well to re-open the hydrocarbon well.

The foregoing and other described implementations can each optionally include one or more of the following features:

A first feature, combinable with any of the following features, wherein the proof testing is a fully-functional test of a safety instrumented function, pressure sensors, the SLS, and final elements associated with the hydrocarbon production system.

A second feature, combinable with any of the previous or following features, wherein the monitored live process condition is whether the overall hydrocarbon production system is below a high-pressure set point value.

A third feature, combinable with any of the previous or following features, wherein: the simulated overpressure condition is induced using a pump attached to valve arrangements at the inlets of operation pressure sensors.

A fourth feature, combinable with any of the previous or following features, wherein the at least two operation pressure sensors read pressure values at or above a pressure trip set point.

A fifth feature, combinable with any of the previous or following features, further configured to perform operations comprising: determining that proof testing of the hydrocarbon well has failed; troubleshooting and fixing a cause of the failure; and initiating a repeat of the proof testing of the hydrocarbon well.

A sixth feature, combinable with any of the previous or following features, further configured to perform operations comprising: determining that the test mode pressure sensors are not healthy; and signaling final elements associated with all wells in the hydrocarbon production system to close for safety reasons.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the described implementations should not be understood as requiring such separation or integration in all implementations, and it should be understood that the described program components and systems can generally be integrated together in a single software product or packaged into multiple software products.

Accordingly, example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:
1. A computer-implemented method, comprising:
receiving a selection of a hydrocarbon well of a hydrocarbon production system at a safety logic solver (SLS) for proof testing;
activating test mode pressure sensors attached to a common header of the hydrocarbon production system to monitor a live process condition status of the common header from all wells of the hydrocarbon production system;

inducing a simulated overpressure condition in operation pressure sensors;
receiving an indication of overpressure at the SLS from at least two operation pressure sensors, wherein the at least two operation pressure sensors read pressure values at or above a pressure trip set point;
signaling final elements associated with the hydrocarbon well to close while leaving other wells in the hydrocarbon production system in operation;
restoring the operation pressure sensors to a normal pressure condition; and
signaling the final elements associated with the selected hydrocarbon well to re-open the hydrocarbon well.

2. The computer-implemented method of claim 1, wherein the monitored live process condition is whether the hydrocarbon production system is below a high-pressure set point value.

3. The computer-implemented method of claim 1, wherein the simulated overpressure condition is induced using a pump attached to valve arrangements at inlets of operation pressure sensors.

4. The computer-implemented method of claim 1, further comprising:
determining that proof testing of the hydrocarbon well has failed;
troubleshooting and fixing a cause of a failure; and
initiating a repeat of the proof testing of the hydrocarbon well.

5. The computer-implemented method of claim 1, further comprising:
determining that the test mode pressure sensors are not healthy; and
signaling final elements associated with all wells in the hydrocarbon production system to close for safety reasons.

6. A non-transitory, computer-readable medium storing one or more instructions executable by a computer system to perform operations comprising:
receiving a selection of a hydrocarbon well of a hydrocarbon production system at a safety logic solver (SLS) for proof testing;
activating test mode pressure sensors attached to a common header of the hydrocarbon production system to monitor a live process condition status of the common header from all wells of the hydrocarbon production system;
inducing a simulated overpressure condition in operation pressure sensors;
receiving an indication of overpressure at the SLS from at least two operation pressure sensors, wherein the at least two operation pressure sensors read pressure values at or above a pressure trip set point;
signaling final elements associated with the hydrocarbon well to close while leaving other wells in the hydrocarbon production system in operation;
restoring the operation pressure sensors to a normal pressure condition; and
signaling the final elements associated with the selected hydrocarbon well to re-open the hydrocarbon well.

7. The non-transitory, computer-readable medium of claim 6, wherein the monitored live process condition is whether the hydrocarbon production system is below a high-pressure set point value.

8. The non-transitory, computer-readable medium of claim 6, wherein the simulated overpressure condition is induced using a pump attached to valve arrangements at inlets of operation pressure sensors.

9. The non-transitory, computer-readable medium of claim 6, wherein the operations further comprise:
determining that proof testing of the hydrocarbon well has failed;
troubleshooting and fixing a cause of a failure; and
initiating a repeat of the proof testing of the hydrocarbon well.

10. The non-transitory, computer-readable medium of claim 6, wherein the operations further comprise:
determining that the test mode pressure sensors are not healthy; and
signaling final elements associated with all wells in the hydrocarbon production system to close for safety reasons.

11. A computer-implemented system, comprising:
a computer memory; and
a hardware processor interoperably coupled with the computer memory and configured to perform operations comprising:
receiving a selection of a hydrocarbon well of a hydrocarbon production system at a safety logic solver (SLS) for proof testing;
activating test mode pressure sensors attached to a common header of the hydrocarbon production system to monitor a live process condition status of the common header from all wells of the hydrocarbon production system;
inducing a simulated overpressure condition in operation pressure sensors;
receiving an indication of overpressure at the SLS from at least two operation pressure sensors, wherein the at least two operation pressure sensors read pressure values at or above a pressure trip set point;
signaling final elements associated with the hydrocarbon well to close while leaving other wells in the hydrocarbon production system in operation;
restoring the operation pressure sensors to a normal pressure condition; and
signaling the final elements associated with the selected hydrocarbon well to re-open the hydrocarbon well.

12. The computer-implemented system of claim 11, wherein the monitored live process condition is whether overall hydrocarbon production system is below a high-pressure set point value.

13. The computer-implemented system of claim 11, wherein:
the simulated overpressure condition is induced using a pump attached to valve arrangements at inlets of operation pressure sensors; and
the at least two operation pressure sensors read pressure values at or above a pressure trip set point.

14. The computer-implemented system of claim 11, wherein the operations comprise:
determining that proof testing of the hydrocarbon well has failed;
troubleshooting and fixing a cause of a failure; and
initiating a repeat of the proof testing of the hydrocarbon well.

15. The computer-implemented system of claim 11, wherein the operations comprise:
determining that the test mode pressure sensors are not healthy; and
signaling final elements associated with all wells in the hydrocarbon production system to close for safety reasons.

* * * * *